United States Patent
Reum

(10) Patent No.: US 11,417,898 B2
(45) Date of Patent: Aug. 16, 2022

(54) FUEL CELL SYSTEM AND METHOD OF OPERATING A FUEL CELL SYSTEM

(71) Applicant: PROTON MOTOR FUEL CELL GMBH, Puchheim (DE)

(72) Inventor: Mathias Reum, Munich (DE)

(73) Assignee: PROTON MOTOR FUEL CELL GMBH, Puchheim (DE)

( * ) Notice: Subject to any disclaimer, the term of this patent is extended or adjusted under 35 U.S.C. 154(b) by 279 days.

(21) Appl. No.: 16/339,317

(22) PCT Filed: Oct. 10, 2017

(86) PCT No.: PCT/EP2017/075823
§ 371 (c)(1),
(2) Date: Apr. 3, 2019

(87) PCT Pub. No.: WO2018/069327
PCT Pub. Date: Apr. 19, 2018

(65) Prior Publication Data
US 2020/0044265 A1    Feb. 6, 2020

(30) Foreign Application Priority Data
Oct. 11, 2016  (DE) .................... 10 2016 119 323.2

(51) Int. Cl.
*H01M 8/04089* (2016.01)
*H01M 8/04537* (2016.01)
*H01M 8/04791* (2016.01)
*H01M 8/04746* (2016.01)

(52) U.S. Cl.
CPC ... *H01M 8/04089* (2013.01); *H01M 8/04619* (2013.01); *H01M 8/04798* (2013.01); *H01M 8/04753* (2013.01)

(58) Field of Classification Search
None
See application file for complete search history.

(56) References Cited

U.S. PATENT DOCUMENTS

| 5,771,476 A | 6/1998 | Mufford et al. |
| 5,991,670 A | 11/1999 | Mufford et al. |
| 2004/0096709 A1 | 5/2004 | Darling et al. |
| 2012/0015270 A1 | 1/2012 | Naganuma |
| 2014/0081497 A1 | 3/2014 | Jeon et al. |
| 2017/0162885 A1* | 6/2017 | Kim ........................ B60L 58/30 |

FOREIGN PATENT DOCUMENTS

| CN | 103682399 A | 3/2014 |
| DE | 10352745 A1 | 6/2004 |
| DE | 112009005098 | 1/2018 |
| JP | 2000208161 A | 7/2000 |
| JP | 2004096835 A | 3/2004 |
| JP | 2004172125 A | 6/2004 |
| JP | 2004273162 A | 9/2004 |

OTHER PUBLICATIONS

Office Action issued in EP17788167.9 dated May 28, 2021 (6 pages), and Machine Translation thereof (3 pages).
German Search Report issued in DE102016119323.2, dated Aug. 3, 2017, 12 pages.
International Search Report and Written Opinion issued in PCT/EP2017/075823, dated Jan. 10, 2018, 14 pages.
English Translation of Office Action in JP2019-515657, drafted Feb. 24, 2021 (6 pages).
English Translation of Office Action KR 10-2019-7010415, dated Jun. 10, 2021 (6 pages).
Office Action in JP2019-515657 dated Dec. 27, 2021 (drafted Dec. 17, 2021) and English Translation thereof.
Office Action received in CN201780063113.8 dated Apr. 28, 2022, and English Translation thereof.

* cited by examiner

*Primary Examiner* — Anca Eoff
(74) *Attorney, Agent, or Firm* — ARC IP Law, PC; Joseph J. Mayo

(57) ABSTRACT

A fuel cell system that includes a fuel cell module having first and second electrical supply terminals with an electrical output voltage applied thereto during operation of the fuel cell module. The electrical supply terminals are coupled to an electrical load, an air supply device that supplies air in an adjustable air quantity to the fuel cell module as one of the reactants for generating the output voltage, and a control device that controls an output power of the fuel cell module at the electrical supply terminals and adjusts the quantity of air supplied by the air supply device. The control device detects a load demand of the load and controls the output power of the fuel cell module in accordance with the detected load demand, to adjust and update the air quantity supplied by the air supply device in accordance with the detected load demand in air-ratio-controlled manner.

8 Claims, 1 Drawing Sheet

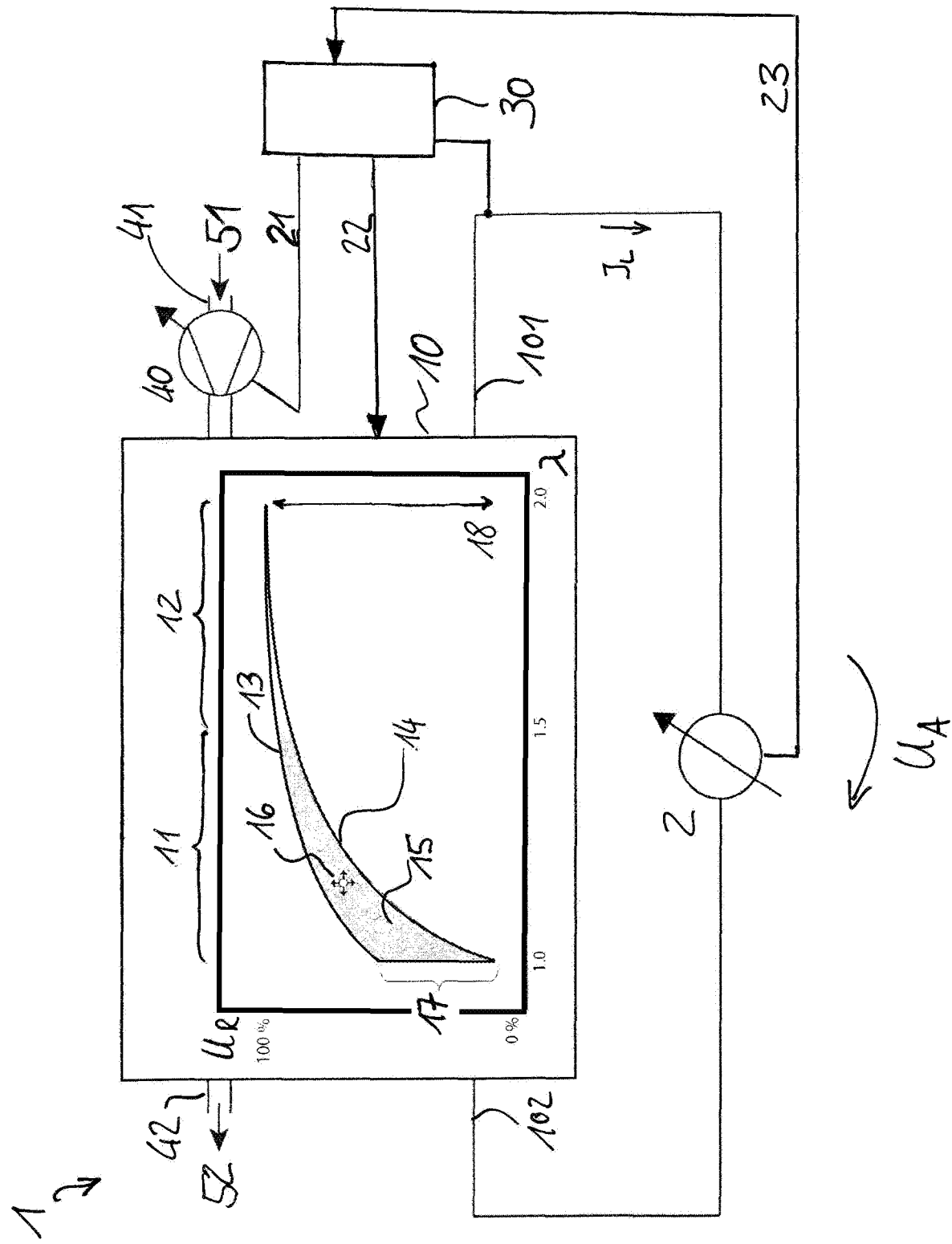

FUEL CELL SYSTEM AND METHOD OF OPERATING A FUEL CELL SYSTEM

CROSS-REFERENCE TO RELATED APPLICATIONS

The instant application is a National Stage entry under 35 USC 371 of the International Application No. PCT/EP2017/075823 filed on Oct. 10, 2017, which claims priority of the foreign priority application No. DE 10 2016 119 323.2 filed on Oct. 11, 2016 in Germany.

BACKGROUND OF THE INVENTION

Field of the Invention

The invention relates to a fuel cell system comprising a plurality of fuel cell modules and to a method of operating such a fuel cell system.

Description of the Related Art

Fuel cells generate electrical energy from hydrogen and oxygen. Oxygen is usually supplied in the form of air (in particular ambient air), and hydrogen is supplied from a reservoir or generated locally, for example from methanol. The fuel cells are typically grouped together into one or more fuel cell stacks and together with numerous peripheral elements, such as lines for supplying fresh operating gases and cooling water, for discharging and/or recirculating used operating gases and cooling water, sensors, valves, control devices, switches, heaters, etc., without which the operation of the fuel cells would not be possible, constitute a fuel cell module. Some of these components are provided with protective covers, housings or sheaths, and all components or at least most of the components are assembled as compactly as possible and accommodated together with the fuel cells in a housing.

In a typical application, a power converter is connected between one or more fuel cell modules (which are interconnected, for example, to a fuel cell group) and the electrical load (such as an electrical consumer, e.g. an electric motor), which on the one hand matches and adjusts the output voltage of the fuel cell module or modules to the voltage of the load and on the other hand matches and adjusts the load current depending on the load demand. A typical power converter which is connected between fuel cell module and load, such as e.g a DC-DC converter, contains switching semiconductor elements, such as e.g. power transistors, which are controlled and switched on the basis of the load current to provide the respective output voltage or the respective load current in accordance with the load demand. Such DC/DC converters, depending on the particular application, are comparatively expensive and lossy in operation, whereby the operating costs increase.

BRIEF SUMMARY OF THE INVENTION

An object of the present invention is to provide a fuel cell system comprising at least one fuel cell module, and a method of operating such a fuel cell system, in which savings in operating costs are rendered possible.

The invention relates to a fuel cell system comprising at least one fuel cell module and to a method of operating such a fuel cell system according to the independent claims. Advantageous embodiments and further developments are specified in the dependent claims.

In accordance with a first aspect, the invention relates to a fuel cell system comprising at least one fuel cell module having a first end a second electrical supply terminal which have an electrical output voltage applied thereto during operation of the fuel cell module and which are configured to be coupled to an electrical load, an air supply device which is connected to the at least one fuel cell module for supplying air in an adjustable quantity of air to the fuel cell module as one of the reactants for generating the output voltage of the fuel cell module, and a control device which is connected to the at least one fuel cell module and to the air supply device for controlling an output power of the at least one fuel cell module at the first and second electrical supply terminals and for adjusting the quantity of air supplied by the air supply device. The control device is configured to detect a load demand of the load and, for controlling the output power of the at least one fuel cell module in accordance with the detected load demand, to adjust and readjust or update the air quantity supplied by the air supply device in accordance with the detected load demand in air-ratio controlled manner on the basis of a specific air ratio.

It is thus possible according to the invention to dispense with a power converter, such as a DC/DC converter, connected between fuel cell module and load. According to the invention, the output power of the at least one fuel cell module is controlled in accordance with the detected load demand by adjusting and updating the air quantity supplied by the air supply device in accordance with the detected load demand.

According to the invention, it is provided, in particular, to use the stoichiometry of the oxidant (the oxygen contained in the air) as a substitute for an intermediate power converter. In particular, the regulation of the air ratio is within certain limits suitable for adjusting and updating the output voltage and thus the performance of the fuel cell system without lasting damage being caused to the fuel cell stack. Thus, the load can be connected directly to the fuel cell module, with the output power of the module being regulated by means of its air supply.

According to another aspect, the invention relates to a method of operating a fuel cell system of the type mentioned above, comprising at least one fuel cell module having a first and a second electrical supply terminal which have an electrical output voltage applied thereto during operation of the fuel cell module and which are coupled to an electrical load, said method comprising the following steps:

supplying air through an air supply device in an adjustable quantity of air to the fuel cell module as one of the reactants for generating the output voltage of the fuel cell module, detecting a load demand of the load, and controlling an output power at the first and second electrical supply terminals of the at least one fuel cell module in accordance with the detected load demand by air-ratio-controlled adjustment and re-adjustment or updating of the air quantity supplied by the air supply device in accordance with the detected load demand.

In particular, the control device is configured to adjust the air quantity supplied by the air supply device in air-ratio-controlled manner on the basis of a specific air ratio, for controlling the output power of the at least one fuel cell module.

In particular, the control device, according to an embodiment, is configured to adjust the air quantity supplied by the air supply device in air-ratio-controlled manner with an air ratio of between 1 and 2. According to an embodiment, the air quantity supplied by the air supply device is adjusted in air-ratio-controlled manner with an air ratio of between 1.5 and 2.

According to an embodiment, the output voltage of the at least one fuel cell module is adjusted in an air-ratio-controlled manner in accordance with an air-ratio to output voltage characteristic stored in a control device.

In particular, the control device has a air-ratio to output voltage characteristic stored therein, and the control device is configured to adjust the output voltage of the at least one fuel cell module in air-ratio-controlled manner in accordance with the air ratio to voltage characteristic.

In accordance with an embodiment, the control device has a first and a second air ratio to output voltage characteristic stored therein, and the control device is configured to adjust the output voltage of the at least one fuel cell module in air-ratio-controlled manner, in a range between the first and second air ratio to output voltage characteristics.

For example, the first air ratio to output voltage characteristic is indicative of a minimum permissible variation of the load demand, and the second air ratio to output voltage characteristic is indicative of a maximum permissible variation of the load demand.

According to an embodiment, the control device, for controlling the output power of the at least one fuel cell module, is configured to adjust the air quantity supplied by the air supply device in accordance with the detected load demand only for load demands of greater than 10% of a maximum permissible load current of the at least one fuel cell module.

According to an embodiment, the air supply device comprises an air compressor.

The functions of the control device described hereinbefore and in the following can also be used analogously in the method described as respective method steps. All embodiments and examples described in this disclosure are applicable analogously to such an operating method as well.

BRIEF DESCRIPTION OF THE DRAWINGS

In the following, the invention will be explained in more detail in the form of an embodiment with reference to the sole drawing FIGURE.

The FIGURE shows an exemplary embodiment of a fuel cell system according to aspects of the invention.

DETAILED DESCRIPTION OF THE INVENTION

The fuel cell system 1 comprises at least one fuel cell module 10. The fuel cell system may also include a plurality of fuel cell modules that are interconnected. For example, the fuel cell modules may be connected in parallel or in series, or in a combination of both, as is well known to the person skilled in the art. The fuel cell module 10 (in the case of a plurality of interconnected fuel cell modules, the fuel cell system 1) has a first electrical supply terminal 101 and a second electrical supply terminal 102 which are configured to be connected to an electrical load 2. In the connected state, as shown in the FIGURE, the supply terminals 101 and 102 of the fuel cell module 10 have an output voltage $U_A$ applied thereto, for supplying a load current $I_L$ to the load 2. The load 2 in general may include, for example, one or more electrical consumers (such as electric motors), one or more power converters (such as a power supply or the like) associated with the consumer, and/or other electrical components of an electrical load circuit, and is representative of electrical components connected on the consumption side to the fuel cell module 10 for taking off a load current.

In particular, the load 2 and the at least one fuel cell module 10 have no power converter (e.g. DC/DC converter) connected therebetween, which is provided for adjusting and re-adjusting or updating the output power of the at least one fuel cell module in accordance with a detected load demand of the load 2. Rather, this is accomplished instead by the inventive cooperation of the control device 30 and the air supply device 40 with the fuel cell module 10, as will be described in more detail below.

The control device 30 of the fuel cell system 1, on the one hand, serves for detecting an operating state of the at least one fuel cell module 10 on the basis of a measured load current (output current) $I_L$ of the fuel cell module. On the other hand, the control device 30 is connected to the fuel cell module 10 for controlling the operation of the fuel cell module 10. To this end, the control device 30 is electrically connected to the fuel cell module 10 via a control line 22 and is adapted to individually switch said module on for operation in the fuel cell system 1, to individually switch it off or also to individually control or regulate its electrical parameters such as module output voltage, current and/or power output. For this purpose, the skilled person can make use of control or regulating mechanisms in interaction between the control device 30 and the fuel cell module 10, which are well known in the art. For example, the supply of the chemical reactants, such as hydrogen and air (oxygen), via the line 22 is adjusted and controlled individually by the control device 30 for controlling the respective operating range (not shown in the FIGURE).

Furthermore, a measuring device can be provided which is connected to the fuel cell module 10 and adapted to measure a load current of the fuel cell module 10. In the present embodiment, the control device 30 has a measuring module (not shown) provided therein, which may be implemented in hardware or software, or in a combination thereof and which can measure the load current $I_L$ of the fuel cell module. In the present exemplary embodiment, the control device 30 contains, for example, a microprocessor which receives the respectively required parameters via an analog/digital interface and calculates the corresponding output variables. One or more parameters which are characteristic of a load demand (hence the requested load current) of the load 2 are transmitted via the line 23 to the control device 30.

Furthermore, there is provided an air supply device 40 which is connected to the at least one fuel cell module 10 for supplying air 51 (here ambient air) in an adjustable quantity of air to the fuel cell module 10. The air 51 serves to provide one of the reactants (here the oxidant oxygen $O_2$) of the fuel cells, which convert the chemical reaction energy of a continuously supplied fuel (here hydrogen) and an oxidant (oxygen) into electrical energy and thus generate the electrical output voltage $U_A$ of the fuel cell module 10. The air 51 is introduced via an inlet 41 into the air supply device 40, for example an air compressor. The air compressor 40 delivers the supplied air 51 through one or more fuel cell stacks where the oxygen contained therein reacts with hydrogen to generate the output voltage $U_A$ in a chemical reaction. Via the outlet 42, used and unconsumed air 52 is led away from the fuel cell stacks and discharged from the fuel cell module 10. The air compressor 40 is connected to the control device 30 via the line 21 and can be controlled by the control device 30 via this line such that the air quantity of the air 51 supplied to the fuel cell module 10 can be varied in individually adjustable manner. This is done, as explained in more detail below, in air-ratio-controlled manner, wherein the control device 30 is connected to a corresponding measuring device (not shown) for measuring the air ratio prevailing in the fuel cell module 10 at the respective fuel cell stack.

According to an embodiment of the invention, the stoichiometry of the oxidant oxygen is used to control the output power of the fuel cell 10 and to re-adjust or update the same in accordance with the load demand of the load 2. Controlling or regulating of the air ratio is within certain limits suitable to reduce the output voltage and thus the power of the fuel cell system without this causing lasting damage to the fuel cell stack. In summary, a load-current-controlled DC/DC converter between the fuel cell module 10 and load 2 is dispensed with, in that the load 2 is electrically connected directly to the fuel cell module 10 and the power of the fuel cell module then is regulated by means of its air supply.

According to an embodiment, the operating point is changed on a stoichiometric output voltage characteristic stored in the control device 30. Stoichiometry is generally understood to mean the oversupply or undersupply of a reactant in a chemical reaction. It is 1.0 when as much reactant is supplied as is needed in the ratio of the chemical reaction. Thus, there is an $H_2$ stoichiometry and an $O_2$ stoichiometry for fuel cells. For reactors that work with atmospheric oxygen (such as a car), the latter is also called "air ratio" ($\lambda$) (lambda). In fuel cells, usual air ratios are between 1.5 and 2 in order to obtain nearly 100% power. Thus, one and a half to two times as much air (oxygen) is supplied by the air supply device 40 as would actually be required in the reaction. If this window is extended to very low values down to $\lambda=1$, the output voltage and thus the power of the fuel cell module will drop to zero in extreme cases (see FIGURE). By adjusting the air quantity of the air supplied (and thus the air ratio), the cell voltage of the fuel cells of the fuel cell module can be increased or decreased (since the chemical reaction with hydrogen is affected), resulting in a variable current flow to the load and thus to indirect power control.

As shown schematically in the FIGURE, one or more air-ratio to output voltage characteristics 13, 14 are stored in the control device 30, wherein the output voltage $U_A$ of the fuel cell module 10 is adjusted in air-ratio-controlled manner, on the basis of $\lambda$ in accordance with the corresponding air ratio to output voltage characteristic. In particular, in the present embodiment, first and second air ratio to output voltage characteristics 13 and 14, respectively, are stored. The first air ratio to output voltage characteristic 13 is indicative of a minimum permissible variation of the load demand and the second air ratio to output voltage characteristic 14 is indicative of a maximum permissible variation of the load demand. The FIGURE shows a relative fuel cell output voltage $U_R$ as a function of the air ratio $\lambda$. The relative fuel cell output voltage $U_R$ is based on the voltage value at rated operation (=100%) and qualitatively corresponds to the course of the output voltage $U_A$. The region 11 identifies the extended operating range with relative output power changes of approximately 60% to 90% in relation to the rated power. By setting an air ratio $\lambda$ between 1.0 and 1.5, the output voltage and thus the output power of the fuel cell module can be adjusted in air-ratio-controlled manner in this operating range. The region 12 identifies an operating range with relative output power changes of approximately 10% to 15% in relation to the rated power. By setting an air ratio $\lambda$ between 1.5 and 2.0, the output voltage and thus the output power of the fuel cell module can be adjusted in air-ratio-controlled manner in this operating range. Overall, a range 18 of approximately 10% to 100% of the output power of the fuel cell module 10 can thus be covered by an air-ratio controlled supply of air 51.

In the present embodiment, the control device 30 adjusts the output voltage $U_A$ of the fuel cell module 10 in air-ratio-controlled manner in an operating range 15 between the first and second air ratio to output voltage characteristics 13, 14. For example, an operating point 16 is set within this range 15. The span 17 denotes a range of an allowable load demand with an air ratio $\lambda$ of 1.0.

According to the invention, power control advantageously takes place via the air supply (or reaction stoichiometry) instead of via a power electronics component such as a DC/DC converter, which can thus can be dispensed with, which significantly reduces the operating costs. Rather, there is effected an adjustment of the control of the air compressor 40 and thus of the quantity of air that is passed through the fuel cell module 10. The prerequisite is that the acceptable range in terms of the operating voltage of the load 2 directly corresponds to the range of supply voltage of the fuel cell module 10, since not only the regulation of the power demand by a no longer present DC/DC converter is eliminated, but also matching of the output voltage of the fuel cell module to the permissible operating voltage of the consumer or load. Thus, the present invention is particularly applicable in applications where the voltage levels of the fuel cell module and the consumer or load are in conformity over the load range.

In particular, the following operating limits can be specified:
  change of the air ratio between $\lambda=1$ and 2, in particular 1.0 and 2.0;
  valid for load currents $I_L$ above 10% of the maximum permissible load current for the fuel cell module.

One may think that an air ratio of 1.0 would have to be sufficient for 100% of the fuel cell power and that the power drops only below this value. Due to diffusion losses, however, an air ratio of significantly greater than 1 must always be used in real fuel cell systems so that the diffusion losses are reduced to zero. At $\lambda=2.0$ this is given with sufficient accuracy in the current state of the art. All values below this value lead to voltage and thus power reductions which, also with the current state of the art, can amount to almost 100% at $\lambda=1.0$. The exact values depend on the detailed cell design and the material selection of the fuel cells. These may be appropriately selected and determined by the skilled person for the particular application and operating conditions.

For a fuel cell system, a maximum permissible load current is generally determined which depends on the area-specific current density (exact values are dependent upon design and operational management). However, there is also a lower limit below which the fuel cell leaves its design range for the reaction management. This is about 10% of the maximum permissible load current in the current state of the art and is the reason for the appropriate restriction described above.

What is claimed is:
1. A fuel cell system, comprising:
  at least one fuel cell module comprising a first and a second electrical supply terminals which comprise an electrical output voltage applied thereto during operation of the at least one fuel cell module and which are configured to be coupled to an electrical load,
  an air supply device which is connected to the at least one fuel cell module for supplying air in an adjustable quantity of air to the at least one fuel cell module as one reactant of a plurality of reactants for generating the electrical output voltage of the at least one fuel cell module, a control device which is connected to the at least one fuel cell module and to the air supply device for controlling an output power of the at least one fuel cell module at the first and the second electrical supply terminals and for adjusting the adjustable quantity of air supplied by the air supply device, wherein the control device is configured to detect a load demand of the electrical load and, for controlling the output power of the at least one fuel cell module in accordance with the load demand that is detected, to adjust and update the adjustable quantity of air supplied by the air supply device in accordance with the load demand that is detected in air-ratio-controlled manner based on a specific air ratio, wherein the control device comprises an air ratio to output voltage characteristic stored therein, and the control device is further configured to adjust the electrical output voltage and thus the output power of the at least one fuel cell module in said air-ratio-controlled manner, in accordance with the air ratio to output voltage characteristic; and, wherein the control device, for controlling the output power of the at least one fuel cell module, is further configured to adjust the adjustable quantity of air supplied by the air supply device in accordance with the load demand that is detected, only for load demands of greater than 10% of a maximum permissible load current of the at least one fuel cell module.

2. The fuel cell system of claim 1, wherein the control device is further configured to adjust the adjustable quantity of air supplied by the air supply device in said air-ratio-controlled manner with an air ratio of between 1 and 2.

3. The fuel cell system of claim 1, wherein the control device is further configured to adjust the adjustable quantity of air supplied by the air supply device in said air-ratio-controlled manner with an air ratio of between 1.5 and 2.

4. The fuel cell system of claim 1, wherein the control device further comprises a first air ratio to output voltage characteristic and a second air ratio to output voltage characteristic stored therein, and the control device is further configured to adjust the electrical output voltage and thus the output power of the at least one fuel cell module in said air-ratio-controlled manner in a range between said first and said second air ratio to output voltage characteristics.

5. The fuel cell system of claim 4, wherein the first air ratio to output voltage characteristic is indicative of a minimum permissible variation of the load demand and the second air ratio to output voltage characteristic is indicative of a maximum permissible variation of the load demand.

6. The fuel cell system of claim 1, wherein the air supply device comprises an air compressor.

7. A fuel cell system, comprising:
at least one fuel cell module comprising a first and a second electrical supply terminals which comprise an electrical output voltage applied thereto during operation of the at least one fuel cell module and which are configured to be coupled to an electrical load, an air supply device which is connected to the at least one fuel cell module for supplying air in an adjustable quantity of air to the at least one fuel cell module as one reactant of a plurality of reactants for generating the electrical output voltage of the at least one fuel cell module, a control device which is connected to the at least one fuel cell module and to the air supply device for controlling an output power of the at least one fuel cell module at the first and the second electrical supply terminals and for adjusting the adjustable quantity of air supplied by the air supply device, wherein the control device is configured to detect a load demand of the electrical load and, for controlling the output power of the at least one fuel cell module in accordance with the load demand that is detected, to adjust and update the adjustable quantity of air supplied by the air supply device in accordance with the load demand that is detected in air-ratio-controlled manner based on a specific air ratio, wherein the control device comprises an air ratio to output voltage characteristic stored therein, and the control device is further configured to adjust the electrical output voltage and thus the output power of the at least one fuel cell module in said air-ratio-controlled manner, in accordance with the air ratio to output voltage characteristic; and wherein the control device further comprises a first air ratio to output voltage characteristic and a second air ratio to output voltage characteristic stored therein, and the control device is further configured to adjust the electrical output voltage and thus the output power of the at least one fuel cell module in said air-ratio-controlled manner in a range between said first and said second air ratio to output voltage characteristics.

8. The fuel cell system of claim 7 wherein the first air ratio to output voltage characteristic is indicative of a minimum permissible variation of the load demand and the second air ratio to output voltage characteristic is indicative of a maximum permissible variation of the load demand.

* * * * *